(No Model.) 3 Sheets—Sheet 1.
E. CLARK.
GUTTER, CURBSTONE, AND SIDEWALK CONDUIT FOR ELECTRIC WIRES.
No. 287,237. Patented Oct. 23, 1883.
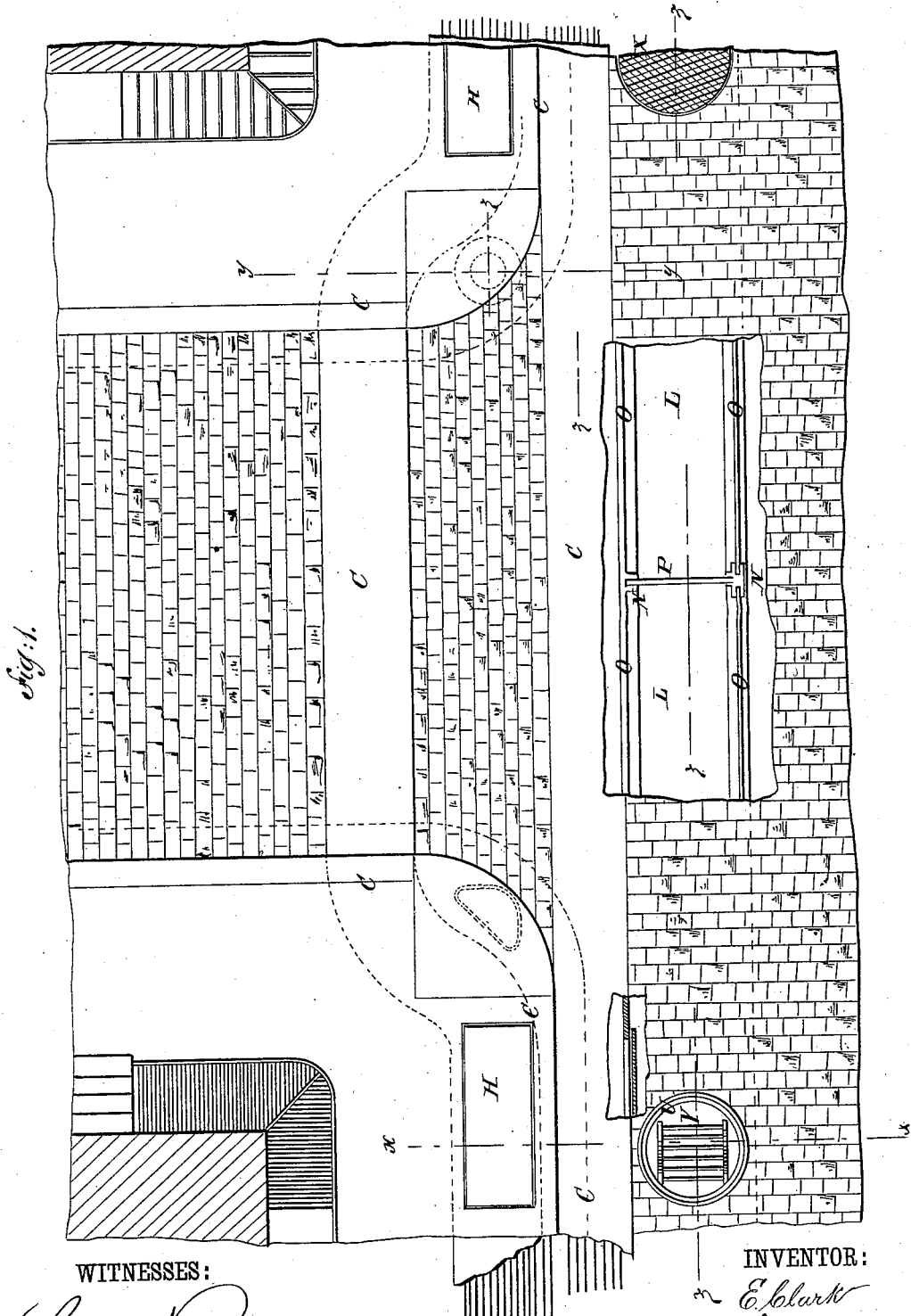
WITNESSES:
INVENTOR:
E. Clark
BY Munn & Co.
ATTORNEYS.
N. PETERS. Photo-Lithographer, Washington, D. C.

(No Model.) 3 Sheets—Sheet 2.
E. CLARK.
GUTTER, CURBSTONE, AND SIDEWALK CONDUIT FOR ELECTRIC WIRES.
No. 287,237. Patented Oct. 23, 1883.
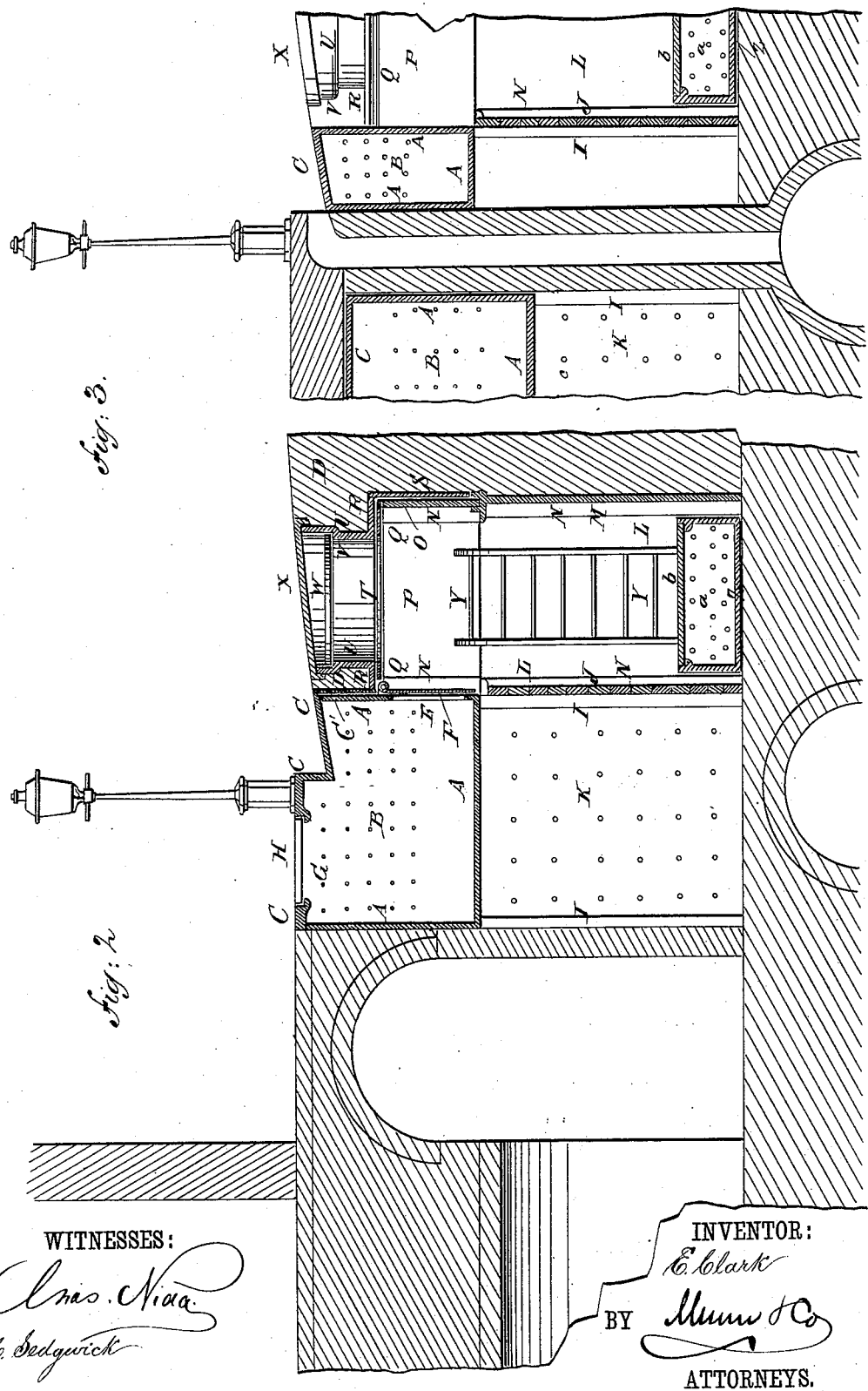
WITNESSES:
INVENTOR:
E. Clark
BY Munn & Co
ATTORNEYS.

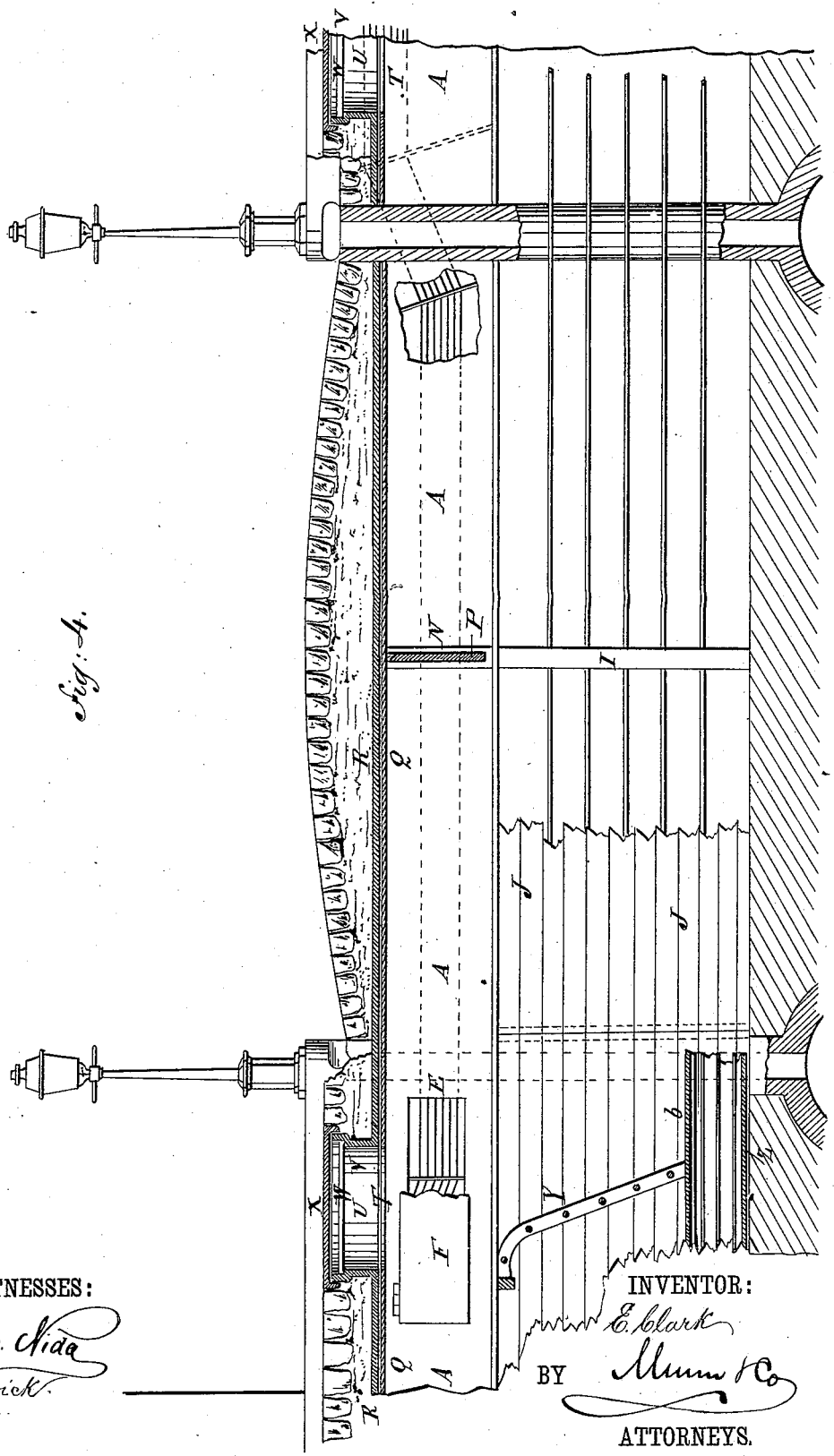

UNITED STATES PATENT OFFICE.

EDWARD CLARK, OF CORNWALL, NEW YORK.

GUTTER, CURBSTONE, AND SIDEWALK CONDUIT FOR ELECTRIC WIRES.

SPECIFICATION forming part of Letters Patent No. 287,237, dated October 23, 1883.

Application filed May 21, 1883. (No model.)

*To all whom it may concern:*

Be it known that I, EDWARD CLARK, of Cornwall, in the county of Orange and State of New York, have invented certain new and useful Improvements in Gutter, Curbstone, and Sidewalk Conduits for Electric Wires, of which the following is a full, clear, and exact description.

Reference is to be had to the accompanying drawings, forming part of this specification, in which similar letters of reference indicate corresponding parts in all the figures.

Figure 1, Sheet 1, is a plan view of my improvement, parts being broken away. Fig. 2, Sheet 2, is a sectional end elevation of the same, taken through the line $x\,x$, Fig. 1. Fig. 3, Sheet 2, is a sectional end elevation of the same, taken through the line $y\,y$, Fig. 1. Fig. 4, Sheet 3, is a sectional side elevation of the same, taken through the broken line $z\,z\,z\,z$, Fig. 1.

The object of this invention is to obtain space for electric wires—such as telegraph, telephone, fire-alarm, and electric-light wires—without interfering with lamp-posts, hydrants, sewer well-holes, and sidewalk-vaults, and without going into the middle part of the street.

A represents a cast-iron box placed along the gutter of a street, with the upper edge of its inner side about upon a level with the sidewalk, and the upper edge of its outer side about upon a level with the street. The box A is made with cross-partitions B, perforated to receive the wires, and having their upper edges rabbeted in the form of the outer part of the sidewalk, the curbstone, and the gutter, as shown, Fig. 2. The box A is provided with a cast-iron cover, C, made in such a shape as to form the outer part of the sidewalk, the curbstone, and the gutter. The part of the cover C that forms the gutter is made wider than ordinary street-gutters, to allow the box A to be made wider, and thus give more room for wires. The cover C has a downwardly-projecting flange, C', along its outer edge, to overlap the outer side of the box A, and extend down as deep as the street paving-stones D, so that the said paving-stones will hold the said cover in place. In the outer side of the box A are formed openings E, to give convenient access to the interior of the said box, and which are closed by doors F, hinged at their upper edges to the said side of the box A. The part of the cover C that forms a part of the sidewalk has openings G formed through it, to give convenient access to the inner part of the interior of the said box. The edges of the cover C around the openings G are rabbeted or flanged, to form seats for the plates H, that close the said openings. The box A is supported by posts I, and the space beneath the said box is excavated to provide space for additional wires, when required. The space beneath the box A is inclosed by planks J, attached to the posts I, and is provided with perforated partitions K, to receive and support wires.

At the outer side of the casing J is excavated a space or vault, L, for the convenience of the workmen, so that access can be had to the conduit without tearing up the street. The vault L is inclosed with a wood or iron casing, M, attached to the posts N, which should be sufficiently strong to support the pavement D above the said vault and the traffic of the street. The upper parts of the posts N are grooved to receive the ends of the side plates, O, that inclose the outer side of the upper part of the vault L, and the ends of the beams P, that cross the upper part of the said vault L, the lower edges of the plates O and beams P resting upon shoulders or flanges formed upon the posts N.

Upon the beams P is laid an iron ring-plate, Q, and above that is placed an iron cover, R, which has a downwardly-projecting flange, S, upon its outer edge, to project downward along the outer sides of the plates O, to prevent water and dirt from entering the vault L. The plate Q and cover R are made sufficiently strong to support the paving-stones D, placed upon them, and the traffic of the street. Through the cover R are formed man-holes T, which are surrounded by flanges U, formed upon the cover R. The curbs or flanges U have shoulders or offsets V in their upper parts to support glass plates W, so that light will be admitted to the vault L without its being necessary to remove the cover R and plate Q to obtain light. The curbs or flanges U are provided with iron covers or caps X, the upper surfaces of which are flush with the surface of the street, and which are made strong enough to support the traffic passing over them. Thus it will be only necessary to remove caps X and to remove the glass to secure an easy access to the vault, and thence to the conduit, while by replacing the glass light and overhead protection are secured for the workmen. Within the vault L, beneath the man-holes T, are placed ladders Y, for the convenience of the workmen entering and leaving the said vault.

In the case of sewer well-holes, lamp-posts, and other obstructions at the corners of streets, a part of the conduit can be carried inward beneath the sidewalk, as shown in Fig. 1, and then taken across the cross-street at a little distance from the street-corners. In case the conduit is intersected by another, the wire-receiving holes of the partitions B are placed at such a distance apart that the two sets of wires can cross each other without coming in contact. When wires are to be taken from the conduit into a house, holes for the passage of the said wires are drilled in the inner side of the said conduit. If more space for wires should be required, a box, Z, with perforated partitions *a* and a detachable cover, *b*, can be placed in the bottom of the vault L, as shown in Figs. 2, 3, and 4.

Having thus described my invention, what I claim as new, and desire to secure by Letters Patent, is—

1. A conduit for electric wires, made substantially as herein shown and described, with its outer side lower than its inner side, and with its perforated cross-partition rabbeted to adapt it to be placed beneath the outer part of a sidewalk and the gutter of a street, as set forth.

2. In a system of conduits for electric wires, the vault L, formed at the side of the conduit beneath the pavement of the street, substantially as herein shown and described, to give convenient access to the said conduit without turning up the street, as set forth.

3. The combination of the grooved and flanged posts N, the side plates, O, the ring-plate Q, the cover R, having flange U, and the cap X, as shown and described.

4. In a conduit for electric wires, the combination, with the posts N, the side plates, O, and the cross-beams P, of the cover R, having downwardly-projecting flange S along its outer edge, and provided with curbed opening T U, having cap-covers X, substantially as herein shown and described, whereby convenient access can be had to the said vault, as set forth.

5. The combination, with cap X, of a cover, R, having a vertical tubular flange, U, shouldered at V, to receive a detachable glass plate, W, which will be covered by the cap at ordinary times, may be lifted out for the workman to pass into the vault, and may be replaced as soon as he has passed in, whereby the workman is protected overhead and yet provided with a sufficiency of light.

EDWARD CLARK.

Witnesses:
EDGAR TATE,
EDWARD M. CLARK.